United States Patent [19]

Meyer et al.

[11] Patent Number: 4,988,549

[45] Date of Patent: Jan. 29, 1991

[54] MULTILAYERED MOULDED PRODUCTS BASED ON POLYAMIDES

[75] Inventors: Rolf-Volker Meyer; Friedrich Fahnler, both of Krefeld; Hanns-Peter Müller, Bergisch-Gladbach; Martin Wandel, Dormagen; Hans-Detlef Heinz, Krefeld, all of Fed. Rep. of Germany

[73] Assignee: Bayer Aktiengesellschaft, Leverkusen, Fed. Rep. of Germany

[21] Appl. No.: 393,132

[22] Filed: Aug. 14, 1989

[30] Foreign Application Priority Data

Aug. 24, 1988 [DE] Fed. Rep. of Germany ....... 3828689

[51] Int. Cl.$^5$ .................... B65D 25/14; B32B 27/08; B05D 7/22
[52] U.S. Cl. ................. 428/35.7; 428/36.91; 428/476.9; 428/336; 428/423.5; 220/454; 427/230; 427/231; 427/386
[58] Field of Search ............... 428/474.4, 423.5, 35.1, 428/35.7, 36.91, 413, 423.1, 476.1, 476.9, 336; 264/DIG. 61; 215/12.1, 12.2; 138/148; 427/230, 231, 386; 220/454

[56] References Cited

U.S. PATENT DOCUMENTS 4,486,507 12/1984 Schumacher ................ 428/476.1

FOREIGN PATENT DOCUMENTS 2093035 8/1982 United Kingdom ............ 428/413

Primary Examiner—James Seidleck
Assistant Examiner—Don Sumihiro
Attorney, Agent, or Firm—Connolly and Hutz

[57] ABSTRACT

This invention relates to the process of applying heat curable reaction resin mixtures of polyisocyanates (a), polyepoxides (b), reaction inhibitors (c), heat activated reaction catalysts (d) and optionally auxiliary agents and additives (e) for the production of multilayered moulded products based on polyamides with a cured duromer layer by applying the mixture and heat curing of the reaction resin mixtures are preferably applied to the polyamide moulded products produced by the anionic lactam polymerization process by rotation, extrusion or centrifugal casting while the said polyamide products are still hot from the heat of polymerization, e.g. to form internal coatings on rotation cast polyamide pipes. The invention further relates to duromer coated multilayered moulded products produced by the above process.

15 Claims, No Drawings

MULTILAYERED MOULDED PRODUCTS BASED ON POLYAMIDES

This invention relates to the process of applying heat curable reaction resin mixtures of polyisocyanates (a), polyepoxides (b), reaction inhibitors (c), heat activated reaction catalysts (d) and optionally auxiliary agents and additives (e) for the production of multi-layered moulded products based on polyamides with a cured duromer layer by applying the mixture and heat curing of the reaction resin mixtures are preferably applied to the polyamide moulded products produced by the anionic lactam polymerisation process by rotation, extrusion or centrifugal casting while the said polyamide products are still hot from the heat of polymerisation, e.g. to form internal coatings on rotation cast polyamide pipes. The invention further relates to duromer coated multilayered moulded products produced by the above process.

Polyamides may be prepared by various processes and from numerous starting materials. The processes employed industrially include hydrolytic polymerisation of polyamide-forming starting materials such as lactams and suitable diamine/dicarboxylic acid mixtures and activated anionic polymerisation of lactams.

All polyamides and, especially those containing at least 30% by weight of CONH groups, tend, by virtue of their high polarity, to undergo a considerable amount of interactions with low molecular weight compounds such as water, alcohols, phenols and other solvents. This generally has undesirable effects, such as softening and dimensional changes of moulded parts produced from such materials.

For this reason, polyamides are not very suitable e.g. as barrier materials unless they are used in multilayered systems such as composite sheet products of polyamides and polyolefins which in their entirety have a satisfactory barrier action against polar and apolar solvents.

Moulded articles produced by anionic polymerisation of lactams, in particular ε-caprolactam, contain about 2 to 5% of extractable monomer components due to the reaction temperature employed, and these monomer components are generally not extracted from the moulded products obtained.

These moulded products (CONH content: ~38%) also tend to undergo interactions with polar compounds and the monomer content is also extractable. For this reason, products such as pipes of cast polyamide, for example, are not permitted for use as drinking water pipes although these materials are otherwise very suitable for this purpose.

It has already been attempted some time ago to apply polyurethane layers to moulded polyamide products by a process which requires a pretreatment of the pA moulded products with formic acid followed by a treatment with an amino alcohol (DE-A-2 142 970). This process is said to improve the PA/PU bond but application of the polyurethane requires the use of complicated apparatus.

DE-A-2 413 103 describes a similarly complicated system for the application of a PU layer to the surface of rotationally symmetrical PA moulded products. This again requires a pretreatment and nothing is stated about the properties of such modified polyamides.

DE-A-3 440 534 describes the application of aqueous dispersions as primers for coatings of plastics. Polyurethanes and inter alia polyamides are mentioned as dispersion polymers.

This procedure is said to enable improved plastics lacquers to be produced.

None of these earlier specifications gives any indication of the possibility of permanently protecting polyamides, e.g. against the action of polar solvents, and of producing barrier effects, by the simple application and cross-linking of suitable monomers or reaction components to impermeable duromers. This, however, is an object of the present invention.

Such systems are in principle of high technological interest as they open up new possibilities of application of polyamides.

It has now surprisingly been found that such duromer-modified polyamide moulded products may easily be obtained when reactive, heat curable reaction resin mixtures of polyisocyanates and polyepoxides containing inhibitors to protect them against premature reaction are cured on the surface of moulded polyamide articles at elevated temperatures with the aid of suitable heat activated catalysts.

If the reaction resin mixtures have been applied to cold polyamide surfaces, they may be cured by heat, infrared radiation or microwave heating but they are preferably applied to hot polyamide surfaces such as are obtained when moulded articles are produced by anionic lactam polymerisation, and are then cured by the inherent heat of polymerisation.

Suitable reaction resin mixtures of (a), (b), (c) and optionally (d) and (e) are described in earlier, as yet unpublished application No. P 38 07 660.8 in the name of the present applicants. Such reaction mixtures have been found to be particularly suitable for the production of multilayered polyamide products according to the invention.

This invention therefore relates to the process where for the production of multilayered moulded products of polyamides with a cured duromer layer, heat curable, storage stable reaction resin mixtures containing
  (a) at least one organic polyisocyanate and
  (b) at least one organic compound containing at least two epoxide groups
in a quantity corresponding to an equivalent ratio of isocyanate groups of (a) to epoxide groups of (b) of from 1 2:1 to 70:1, in particular from 1 2:1 to 30:1, and
  (c) at least one alkylating agent for inhibiting the premature reactIon of (a) and (b).
  (d) at least one heat activatable catalyst in quantitIes of from 0.01 to 10% by weight, in particular from 0.1 to 2% by weight (based on (a)+(b)+c)),
  (e) and optionally other, conventionally used auxiliary agents and additives in effective quantities
are applied to the moulded polyamide products and the mixture is heat cured thereon.

Component (a) of the heat curable mixtures may be any organic polyisocyanates known from polyurethane chemistry, such as, for example, aliphatic, cycloaliphatic, araliphatic, aromatic or heterocyclic polyisocyanates as described e.g. by W. Siefken in Justus Liebigs Annalen der Chemie, 562, pages 75 to 136, for example those corresponding to the following formula:

$$Q(NCO)_n.$$

wherein
  n = 2 to 4, preferably 2, and
  Q denotes an aliphatic hydrocarbon group containing 2 to 18, preferably 6 to 10 carbon atoms, a cycloaliphatic hydrocarbon group containing 4 to 19, preferably 5 to 15 carbon atoms, an aromatic hydrocarbon group containing 6 to 15, preferably 6 to 13 carbon atoms or an araliphatic hydrocarbon group containing 8 to 15, preferably 8 to 13 carbon atoms, e.g aliphatic or cycloaliphatic polyisocyanates such as 1,4tetramethylene diisocyanate, 1,6-hexamethylene diisocyanate, 1,12-dodecane diisocyanate, cyclobutane-1,3-diisocyanate, cyclohexane-1,3- and 1,4-diisocyanate and any mixtures of these isomers, 1-isocyanato-3,3,5-trimethyl-5-isocyanatomethyl-cyclohexane (isophorone diisocyanate), 2,4- and 2,6-hexahydrotolylene diisocyanate and any mixtures of these isomers, hexahydro-1,3- and/or 1,4-phenylene diisocyanate, perhydro-2,4'- and/or -4,4'-diphenylmethane diisocyanate, aromatic polyisocyanates such as 3,3'-dimethyl- or 3,5,3',5'-tetramethyl-dicyclohexylmethane diisocyanate, 1,3- and 1,4-phenylene diisocyanate, 2,4- and 2,6-tolylene diisocyanate and any mixtures of these isomers, diphenylmethane-2,4'- and/or -4,4'- and/or 2,2'-diisocyanate and naphthylene-1,5-diisocyanate. The following may also be used according to the invention: triphenyl methane-4,4',4"-triisocyanate, polyphenyl-polymethylene polyisocyanates such as are obtained by aniline/formaldehyde condensation followed by phosgenation, m- and p-isocyanato-phenyl sulphonyl isocyanates, perchlorinated aryl polyisocyanates, polyisocyanates containing carbodiimide groups, norbornane diisocyanates, polyisocyanates containing allophanate groups, polyisocyanates containing isocyanurate groups, polyisocyanates containing urethane groups, polyisocyanates containing acylated urea groups, polyisocyanates containing biuret groups, polyisocyanates prepared by telomerisation reactions, polyisocyanates containing ester groups, reaction products of the above mentioned isocyanates with subequivalent quantities of diols and polyisocyanates containing polymeric fatty acid esters, and araliphatic diisocyanates such as m- or p-xylylene diisocyanate.

Any mixtures of the above mentioned polyisocyanates may also be used.

Commercially readily available polyisocyanates are generally preferred, e.g. 2,4- and 2,6-tolylene diisocyanate and any mixtures of these isomers (TDI), and especially polyphenylpolymethylene polyisocyanates prepared by aniline/formaldehyde condensation followed by phosgenation (crude MDI) and polyisocyanates containing carbodiimide groups, urethane groups, allophanate groups, isocyanurate groups, urea groups or biuret groups (modified polyisocyanates),especially those modified polyisocyanates which are derived from 2,4- and/or 2,6-tolylene diisocyanate or from 4,4'- and/or 2,4'-diphenylmethane diisocyanate and the corresponding products of hexamethylene diisocyanates(-HDI), e.g. biuret polyisocyanates and isocyanurate polyisocyanates based on HDI. An isomeric and/or homologous mixture of polyisocyanates of the diphenylmethane series containing more than 20% by weight of 2,4'-diisocyanatodiphenylmethane is also very suitable.

Particular embodiments of the aromatic isocyanate component (a) and of the epoxide systems (component (b)) are described in DE-A No. 36 00 764 and may preferably be used here in analogous manner.

Component (b) may consist of any aliphatic, cycloaliphatic, aromatic or heterocyclic compounds containing at least two epoxide groups, i.e. preferably 1,2-epoxide groups. Polyepoxides which are preferred as component (b) have from 2 to 4, preferably 2 epoxide groups per molecule and an epoxide equivalent weight of from 90 to 500, preferably from 170 to 20.

The following are examples of suitable polyepoxides: polyglycidyl ethers of polyvalent phenols, for example of pyracatechol, resorcinol, hydroquinone, 4,4'-dihydroxydiphenylmethane, 4,4'-dihydroxy-3,3'-dimethyldiphenylmethane, 4,4'-dihydroxydiphenylether, 4,4'-dihydroxydiphenylcyclohexane, 4,4'-dihydroxy-3,3'-dimethyldiphenylpropane, 4,4'-dihydroxydiphenyl, 4,4'-dihydroxydiphenylsulphone and of tris-(4-hydroxyphenyl)-methane and of the chlorination and bromination products of the above mentioned diphenols and of novolaks (i.e. of reaction products of monovalent or higher valent phenols and aldehydes, in particular formaldehyde, in the presence of acid catalysts) as well as the polyglycidyl ethers of diphenols which have been obtained by the esterification of 2 mol of the sodium salt of an aromatic hydroxy carboxylic acid with 1 mol of a dihalogenoalkane or a dihalogenodialkyl ether (see British Patent No. 1 017 612), or of polyphenols obtained by the condensation of phenols with long chained halogenoparaffins containing at least 2 halogen atoms (see GB-PS No. 1 024 288). Polyepoxide compounds based on aromatic amines and epichlorohydrin may also be used, e.g. N-di-(2,3-epoxypropyl)-aniline, N,N'-dimethyl-N,N'-diepoxypropyl-4,4'-diaminodiphenylmethane or N-diepoxypropyl-4-amino-phenylglycidyl ether (see GB-PS No. 772 830 and No. 816 923).

The following may also be used: glycidyl esters of polybasic aromatic, aliphatic and cycloaliphatic carboxylic acids, e.g. the diglycidyl ester of phthalic acid, the diglycidyl ester of adipic acid and glycidyl esters of reaction products of 1 mol of an aromatic or cycloaliphatic dicarboxylic acid anhydride and ½ mol of a diol or 1/n mol of a polyol containing n hydroxyl groups or hexahydrophthalic acid diglycidyl ester, optionally substituted with methyl groups.

Glycidyl ethers of polyhydric alcohols may also be used, for example the glycidyl ethers of 1,4-butane diol, 1,4-butene diol, glycerol, trimethylolpropane, pentaerythritol and polyethylene glycols. Triglycidyl isocyanurate, N,N'-diepoxypropyloxamide and polyglycidylthio ethers of polyvalent thiols, e.g. of bis-mercaptomethylbenzene, diglycidyltrimethylenetrisulphone and polyglycidyl ethers based on hydantoins are also of interest.

Lastly, the polyepoxides used may be epoxidation products of multiunsaturated compounds such as vegetable oils and their conversion products, epoxidation products of di- and polyolefines such as butadiene, vinylcyclohexene, 1,5-cyclooctadiene, 1,5,9-cyclododecatriene and polymers and copolymers still containing epoxidizable double bonds, e.g. on the basis of polybutadiene, polyisoprene, butadiene/styrene copolymers, divinylbenzene, dicyclopentadiene and unsaturated polyesters; further, epoxidation products of olefines which are obtainable by Diels Alder Addition and subsequently converted into polyepoxides by epoxidation with per compounds, or the epoxidation products of compounds containing two cyclopentene or cyclohexene rings linked through bridging atoms or bridging atomic groups. Polymers of unsaturated monoepoxides may also be used, for example, polymers of methacrylic acid glycidyl ester or of allyl glycidyl ether.

The following polyepoxide compounds or mixtures thereof are preferably used as component (b) according to the invention: Polyglycidyl ethers of polyvalent phenols, in particular of bisphenol A; polyepoxide compounds based on aromatic amines, in particular on bis-(N-epoxypropyl)-aniline, N,N'-dimethyl-N,N'-diepoxypropyl-4,4'-diaminodiphenylmethane and on N-diepoxypropyl-4-amino-phenylglycidyl ether; polyglycidyl esters of cycloaliphatic dicarboxylic acids, in particular hexahydrophthalic acid diglycidyl esters, and polyepoxide of the reaction products of n mols of hexahydrophthalic acid anhydride and 1 mol of a polyol containing n hydroxyl groups (n=integer from 2 to 6), in particular 3 mol of hexahydrophthalic acid anhydride and 1 mol of 1,1,1-trimethylol propane, and 3,4-epoxycyclohexylmethane-3,4-epoxycyclohexanecarboxylate.

Liquid polyepoxides or low viscosity diepoxides such as bis-(N-epoxypropyl)-aniline or a vinyl cyclohexane diepoxide may in special cases further lower the viscosity of polyepoxides which are already liquid or convert solid polyepoxides into liquid mixtures.

Component (b) is used in a quantity corresponding to an 20 equivalent ratio of isocyanate groups to epoxide groups of from 1.2:1 to 500:1, preferably from 3:1 to 70:1, especially from 5:1 to 30:1.

Alkylating agents (c) may be any alkylating esters of organic sulphonic acids. These sulphonic acid alkyl esters preferably have a molecular weight of from 110 to 250. Both aliphatic sulphonic acid alkyl esters such as n-butane sulphonic acid methyl ester, n-perfluorobutane sulphonic acid methyl ester or n-hexane sulphonic acid ethyl ester and aromatic sulphonic acid alkyl esters such as benzene sulphonic acid methyl ester, ethyl ester or n-butyl ester, p-toluene sulphonic acid-methyl ester, -ethyl ester or -n-butyl ester, 1-naphthalene sulphonic acid methyl ester, 3-nitrobenzene sulphonic acid-methyl ester or 2-naphthalene sulphonic acid-ethyl ester may be used. The above mentioned aromatic sulphonic acid esters are preferred. p-Toluene sulphonic acid methyl ester is particularly preferred as component (c). Methyl iodide and dimethylsulphate may also be used as component (c) but are less preferred. The alkylating agents (c) preferably transfer alkyl groups containing 1 to 4 carbon atoms, preferably methyl groups.

Component (c) is preferably used in quantities of from 0.001 to 1% by weight, in particular from 0.005 to 0.3% by weight, based on the sum of components (a) and (b). Component (c) may be added to the multicomponent system in its pure form or e.g. as solution in component (a).

For carrying out the inhibition reaction, inhibitor (c) is heated with components (a) and (b) to about 150° C, e.g. to 120° C for up to about 2 hours, preferably before the addition of the other components, and is then cooled. The resulting mixture, which is stable in storage and no longer reactive, may then be mixed with catalyst (d) at a temperature below the heat activation temperature, preferably at room temperature, and the auxiliary agents and additives (e) may be introduced at this stage although if convenient they may already be present in (a)+(b)+(c) during the phase of inhibition.

The heat activatable latent catalyst component (d) consists of tertiary or quaternary ammonium salts of
 (i) organic amines and
 (ii) alkylating or acid esters of organic phosphonic acids or of phosphoric acid.

Catalysts of this type give rise to systems which are stable in storage or systems which have a very long "open" pot life at room temperature. It is only above a certain temperature, e.g. >60° to >80° C, that they become activated by heat and catalytically active.

Component (i) of catalysts (d) may be any monofunctional or polyfunctional organic amines containing secondary and/or tertiary amino groups. For the preparation of the catalysts, secondary amino groups may be converted into tertiary ammonium groups by alkylation and tertiary amino groups may be converted into tertiary ammonium groups by neutralization or into quaternary ammonium groups by quaternization. Suitable amines of the above mentioned type generally have a molecular weight of from 45 to 353, preferably from 45 to 185.

Typical examples of suitable amines include dimethylamine, trimethylamine, diethylamine, triethylamine, di-n-butylamine, tri-n-butylamine, N,N'-dimethylethylene diamine, N,N,N',N'-tetramethylene diamine, N,N-dimethyl-benzylamine and permethyl-diethylenetriamine.

Component (ii) consists of alkylating or acid esters of organic phosphonic acids or of phosphoric acid. The phosphonic acid esters used are preferably neutral, alkylating esters of organic phosphonic acids. These compounds generally have a molecular weight of from 124 to 214. Examples of suitable compounds of this type include methane phosphonic acid dimethyl ester, methane phosphonic acid diethyl ester, benzene phosphonic acid dimethyl ester, benzene phosphonic acid diethyl ester and ethane phosphonic acid diethyl ester. The esters of phosphoric acid used may be either monobasic acid esters or neutral esters. These compounds generally have a molecular weight of from 126 to 266. Suitable examples include dimethyl phosphate, diethyl phosphate, di-n-butyl phosphate, triethyl phosphate and tri-n-butyl phosphate. Methane phosphonic acid dimethyl ester and di-n-butyl phosphate are preferred components (ii) of the catalysts (d) used according to the invention.

The catalysts (d) are prepared by known processes (e.g. Houben-Weyl, volume XII/2, pages 262 et seq) of reacting the components (i) and (ii) exemplified above, preferably in equivalent quantities, with or without solvents, at temperatures from 20° to 200° C. It may be advantageous to carry out this process under an inert gas and/or under pressure. Component (i) or component (ii) may be used in excess and the unreacted excess may subsequently be removed, for example by distillation.

The following formulae represent particularly preferred examples of catalysts (d) which may be used for the invention.

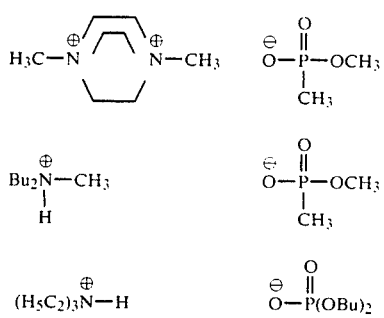

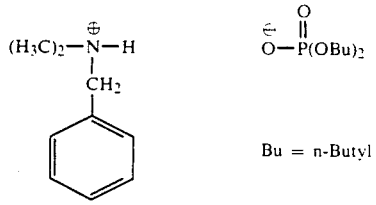

Bu = n-Butyl

Latent catalysts (d) of the type of boron chloride/amine complexes may also be used, e.g. dimethylbenzylamine.BCl₃ or dimethyloctylamine.BCl₃. Further, any known heat activatable catalysts for this type of reaction may in principle be used for the reaction.

Based on 100 parts by weight of the mixture of components (a) and (b), the catalysts (d) are used in a quantity of from 0.01 to 10 parts by weight, preferably from 0.1 to 2 parts by weight. Mixtures of different catalysts, may of course, be used. If the catalysts (d) used are solid at room temperature, they are preferably dissolved in one of the components, preferably in component (a), before being added to the other components according to the invention.

To prepare the mixtures according to the invention, the main components (a), (b), (c) and (d) are mixed together, component (b) being used in such a quantity that the mixtures contains component (a) and (b) in quantities corresponding to an equivalent ratio of isocyanate groups to epoxide groups of from 1 2:1 to 70:1, preferably from 1 2:1 to 30:1.

The auxiliary agents and additives (e) optionally used in the mixtures according to the invention may consist, for example, of (e1) polymerisable, olefinically unsaturated monomers used in quantities of up to 100% by weight, preferably up to 50% by weight, based on the total weight of components (a) plus (b). The following are further examples of auxiliary agents and additives (e) optionally used:

(e2) organic compounds containing isocyanate reactive hydrogen atoms. These may be used in quantities providing up to 0.5, preferably up to 0 4 active hydrogen atoms of component (e2) for each isocyanate group of component (a). When such additives (e2) are used, the above mentioned equivalent ratio of isocyanate groups to epoxide groups refers to the isocyanate excess remaining after the reaction with the active hydrogen atoms.

It is generally not necessary to use auxiliary agents (e1) or (e2). The addItives mentioned under (e1) are preferred to those mentioned under (e2) but in principle, both types of additives may be used together. When additives (e1) are used, it is generally not necessary also to use conventional polymerisation initiators such as benzoyl peroxide.

Typical examples of additives (e1) include olefinically unsaturated monomers not containing any isocyanate reactive hydrogen atoms, e.g. diisobutylene, styrene, C₁ to C₄ alkyl styrenes such as α-methylstyrene, α-butylstyrene, vinyl acetate, C₁ to C₆ alkyl esters of acrylic acid, such as methyl acrylate, butyl acrylate or octyl acrylate, the corresponding methacrylic acid esters, acrylonitrile and diallyl phthalate. Any mixtures of such olefinically unsaturated monomers may also be used. If additives (e1) are used styrene and/or C₁ to C₄ alkyl esters of (meth)acrylic acid are preferred.

Examples of the optional additives (e2) containing isocyanate reactive hydrogen atoms are in particular organic compounds in the molecular weight range of from 62 to 2000 containing 2 to 8, preferably 2 or 3 alcoholic hydroxyl groups, such as the compounds used as starting materials for polyurethanes. Examples include simple polyhydric alcohols such as ethylene glycol, hexamethylene glycol, glycerol or trimethylolpropane; polyhydroxyl compounds containing ester groups, e.g. castor oil or the polyhydroxyl polyesters obtainable by the polycondensation of excess quantities of simple polyhydric alcohols of the type exemplified above with preferably dibasic carboxylic acids or their anhydrides such as adipic acid, phthalic acid or phthalic acid anhydride; or polyhydroxypolyethers obtainable by the chemical addition of alkylene oxides such as propylene oxide and/or ethylene oxide to starter molecules such as water, the simple alcohols mentioned above or amines containing at least two aminic NH bonds.

The following are further examples of auxiliary agents and additives (e) optionally used:

(e3) conventional catalysts used in isocyanate chemistry, e.g. catalysts which accelerate the trimerisation of isocyanate groups and/or the addition of isocyanate groups to epoxide groups. These catalysts may be used in addition to the heat activatable catalyst (d) according to the invention when the reactivity of the mixtures according to the invention is to be adapted to a particular purpose, but they reduce the stability of the mixture in storage and in the strict sense falsify the character of the heat activatable reaction resin mixture.

The following are examples of suitable additives (e3): tertiary amines such as triethylamine, tributylamine, N-methyl-morpholine, N-ethylmorpholine, N,N,N',N'-tetramethylethylene diamine, pentamethyl-diethylenetriamine, 1,4-diazobicyclo-(2,2,2)-octane, bis-(dimethylaminoalkyl)-piperazines (DE-OS No. 2 636 787), N,N-dimethylbenzylamine, N,N-dimethylcyclohexylamine and monocyclic and bicyclic amidines (DE-OS No. 1 720 633), and bis-(dialkylamino)alkyl ethers. The compounds used as additives (e3) may be known Mannich bases of secondary amines such as dimethylamine and aldehydes, preferably formaldehyde, or ketones such as acetone, methylethyl ketone or cyclohexanone, and phenols such as phenol, nonylphenol or bisphenol. Nitrogen-containing bases such as tetraalkyl ammonium hydroxides, alkali metal hydroxides such as sodium hydroxide, alkali metal phenolates such as sodium phenolate and alkali metal alcoholates such as sodium metholate may also be used as catalysts (e3). Hexahydrotriazines may be used as catalysts (e3) (DE-OS No. 1 769 043).

Organic metal compounds may also be used as catalysts (e3), in particular organic tin compounds. The organic tin compounds used are preferably tin(II) salts of carboxylic acids, such as tin(II) acetate, tin(II) octoate, tin(II) ethyl hexoate and tin(II) laurate as well as tin(IV) compounds such as dibutyl tin oxide or dioctyl tin diacetate.

Examples of catalysts (e3) which accelerate the addition reaction of isocyanate groups to epoxide groups include the compounds mentioned in "Russian Chem. Reviews 52(6), (1983), pages 576 to 593".

Other auxiliary agents and additives (e4) optionally used include, for example, fillers, pigments and plasticisers. Suitable fillers are, for example, quartz powder, chalk and aluminium oxide. Titanium dioxide, iron oxide and organic pigments such as phthalocyanine pigments are examples of suitable pigments. Examples of suitable plasticisers include dioctylphthalate, tributyl phosphate and triphenyl phosphate. Soluble dyes or reinforcing materials may also be used, e.g. glass fibres or glass fabrics.

For the preparation of the mixtures according to the invention, the individual components (a), (b) and (c) are preferably inhibited by heating and then mixed with (d) and optionally (e), for example at temperatures within the range of from 0° to 40° C, preferably from 20° to 30° C. The reaction resin mixture thus obtained have a pot life of at least seven days at room temperature. Preferred storage stable reaction resin mixtures have a viscosity of from 20 to 20,000 mPas at 25° C. They show signs of a chemical reaction only above 60° C. The mixtures may therefore be cured at temperatures above 60° C, i.e. in particular from 80° to 150° C and for obtaining optimum properties it is frequently advisable to carry out an after-curing on the resulting synthetic resins at temperatures of from 150° to 200° C, preferably from 160° to 180° C.

The polyamides used may be linear polycondensates of diamines and dicarboxylic acids, such as 6,6-, 6,7-, 6.8-, 6,9-, 6,10-, 6,12-, 8,8- and 12, 12-polyamides of amino acids or the corresponding lactams containing at least 5 carbon atoms in the ring, e.g. $\epsilon$-caprolactam or lauryl lactam, and amino undecanoic acid or polycondensates of aromatic dicarboxylic acids such as isophthalic acid or terephthalic acid with diamines such as hexamethylene diamines or octamethylene diamine; polycondensates obtained from araliphatic starting materials such as m- or p-xylylene diamines and adipic acid, suberic acid or sebacic acid; and polycondensates based on alicyclic starting materials such as cyclohexane dicarboxylic acid, cyclohexane diacetic acid, diamino-dicylcohexyl methanes or isophorone diamine.

Partially crystalline polyamides are preferably used, most preferably PA 6 and PA 66 and especially polyamides which have been obtained by anionic polymerisation of lactams such as pyrrolidone, $\epsilon$-caprolactam or lauryl lactam, and among these, preferably those obtained predominantly ($\geqq 80\%$) or entirely by anionic polymerisation of $\epsilon$-caprolactam.

The heat curable reaction resin mixtures are applied in known manner to the moulded parts which have been heated to the required temperature to form thereon layers of the required thickness, e.g. from 0.001 to 3 mm, preferably from 0.05 to 1 mm, and are then optionally subjected to the (further) action of heat at $\geqq 60°$ C but below the softening temperature of the polyamide. The temperature of the polyamide moulded parts is preferably so chosen that it is sufficiently high for curing.

The immersion process may be employed for relatively small moulded parts. If the parts have a large surface area, e.g. shock absorbers or the side parts of motor vehicles, the mixtures may be applied by a method analogous to that of on-line lacquering, optionally with additional heating.

A particularly elegant procedure and particularly preferred for practical purposes is the application of the duromer layer to moulded articles produced by activated, anionic polymerisation of lactams by rotation processes.

In such cases, the layer of reaction resin may be applied to the internal surfaces of the moulded product immediately after the polymerisation and moulding of the lactam, making use of the remaining heat of lactam polymerisation and preferably employing the rotation process for the application of the layer. Polyamide multilayered moulded products are thus obtained which are particularly suitable for transport or storage of water and polar solvents since direct contact of these solvents with the polyamide matrix is avoided and both swelling of the polyamide and penetration with extraction of the monomers from the polyamide become impossible or at least very difficult.

Tumble casting is also a suitable process for the application of the reaction resin layer, for example when tanks or hollow vessels are to be equipped with an internal coating.

Another embodiment uses the application of the storage stable, relatively low viscosity reaction resin mixture to melt-extrusion films, the mixture being applied while the film matrix is still hot.

The preferred method of using the reaction mixture for the production of multilayered moulded products based on polyamides obtained by the anionic polymerisation of lactams, preferably $\epsilon$-caprolactam, in rotational apparatus, is characterised in that a heat curable reaction mixture is applied to the internal walls of the still hot moulded product in the rotational apparatus and is polymerised by the residual heat of polymerisation present in the moulded polylactam article to form a water repellent and solvent repellent barrier layer.

If the reaction resin mixture, the catalyst and the hardening conditions are suitably adjusted to one another, very firmly adhering duromer coatings which are inert to polar solvents are obtained.

These modified moulded products based on polyamides may advantageously be used wherever polyamides have proved serviceable on account of their good use properties but also wherever polyamides have only been of limited use on account of the sensitivity of PA surfaces to water, organic solvents or salts (corrosion). This applies, for example, to the manufacture of cooling water tanks, and the outsides of motor vehicles, where glass fibre reinforced polyamides are preferably used.

The hollow bodies produced by anionic polymerisation of lactams, such as pipes and tanks, may be used for the storage and transport of water as well as fuels if they have been equipped with the duromer barrier layer according to the invention since no residual lactam is then extractable They no longer forfeit some of their rigidity by the absorption of polar solvents such as water or alcohols which would otherwise soften them. Due to this advantage, the multilayered hollow bodies according to the invention are also suitable for use as motor fuel tanks, especially for fuels containing methanol.

EXAMPLE 1

20 parts by weight of a mixture of (a) 60% of 2,4'-diisocyanatodiphenylmethane and 40% of 4,4'-diisocyanatodiphenylmethane (isocyanate content=33.6%) (MDI) are mixed with 30 parts by weight of the diglycidyl ether (b) of bisphenol A (epoxide number=0.5) and 1.5 ml of a separately prepared 1 molar solution of p-toluene sulphonic acid methyl ester (c) In the above mentioned diisocyanate mixture (MDI) and the mixture is heated to 120° C for 30 minutes with stirring under nitrogen. A reactive resin 1 having the following data is obtained on cooling:

% NC)=26.2 (based on the total mixture)

viscosity: 55 mPas/25° C.

Use of the reactive resin I for the preparation of moulded articles:

100 parts by weight of reactive resin I from Example 1 are mixed with 0.5 parts by weight of dimethylbenzyl ammonium dibutyl phosphate ((d) and 0.2 ml of dimethylbenzylamine (e3) and the mixture is degasified with stirring in a vacuum. The activated reaction resin mixture thus obtained is then poured into a hollow body which has previously been produced by tumble casting. The hollow body is again set into a tumbling motion at 120° C. for 30 minutes. A smooth, solvent free multilayered moulded article based on a polyamide with a layer amounting to 2 5% by weight, based on the total mass of the hollow body, is thus obtained.

EXAMPLE 2

950 parts by weight of a mixture of 60% of 2,4'-diisocyanatodiphenylmethane and 40% of 4,4'-diisocyanatodiphenylmethane (isocyanate content = 33 6%) are mixed with 50 parts by weight of the dIglycIdyl ether of bisphenol A (epoxide number = 0.585) and 0.5 ml (3.2 mmol) of dimethylbenzylamine at 50° C and the mixture is then heated to 120° C. The slightly exothermic reaction indicates the instant onset of the formation of isocyanurate and oxazolidinone. After a reaction time of 15 minutes without external heating, the reaction mixture is cooled with ice water so that the reaction temperature is reduced to about 90° C. A sample is removed from the reaction mixture. The sample is a solid, sticky resin at room temperature and has an isocyanate content of 18 4% NCO. The reaction is stopped by the addition of 6.5 ml of inhibitor solution I(=15.4% by weight solution of p-toluene sulphonic acid methyl ester (c) in a mixture of 60% of 2,4'-diisocyanatodiphenylmethane and 40% of 4,4'-diisocyanatodiphenylmethane). A further 596 parts by weight of the above mentioned diisocyanate component and 31 parts by weight of the above mentioned diglycidyl ether are then added to the reaction mixture and the mixture is stirred at 120° C until a clear, homogeneous solution is obtained. A clear, yellow, storage stable resin which is liquid at room temperature and has a viscosity of 9300 mPas at 25° C and an isocyanate content of 23.6% is obtained.

100 parts by weight of the resin from Example 2 having a viscosity of $\eta_{25° C.}$ = 9300 mPas and an isocyanate content of 23 6% NCO are mixed with 0.5 parts by weight of dimethylbenzyl ammonium dibutyl phosphate (d) and the mixture is degasified in a vacuum of about 5 mbar at 80° C with stirring until the liquid in the container is free from bubbles. The time required for this is about 20 minutes.

30 parts by weight of this reaction resin mixture were introduced into a flask rotating biaxially at 30 revs per min. This flask had been produced immediately beforehand by activated anionic polymerisation of caprolactam and was at an internal temperature of about 110° C. The ratio by weight of resin to flask was about 1:22.

Rotation was then continued for a further 2 to 3 minutes and the flask was removed from the mould. The reaction resin had hardened to a complete surface film with an average thickness of about 0.3 mm which adhered very firmly to the polycaprolactam (polyamide 6).

EXAMPLE 3

95 parts by weight of triisocyanatelexylbiuret (a) are mixed with 5 parts by weight of the bis-glycidyl ester (b) of hexahydrophthalic acid and stirred up with 0.5 parts by weight of the methyl ester of p-toluene sulphonic acid (c) for 30 minutes at 120° C under nitrogen. A storage stable reaction resin C having the following data is obtained on cooling:

% NCO = 21

$\eta_{25° C}$ = 2020 mPas.

The reaction resin C is mixed with 1 part by weight of triethylmethyl ammonium-methanemethyl phosphonate ((d) to form a heat activatable, storage stable reaction resin mixture which is used for the centrifugal casting of the polyamide.

A polyamide-6 flask is coated as described in Example 2. The duromer film shows excellent adherence and great toughness and has a very good barrier action against water and solvents.

EXAMPLE 4

This example demonstrates the excellent barrier action against water of the duromer layer which is to be applied according to the invention.

Water is introduced into a PA 6 flask which has been produced by the activated anionic reaction casting process and coated as in Example 2, and the increase in weight of the flask is determined by pouring out the water after a specified length of time, drying the flask in air and weighing it. Table 1 shows the percentage increase in weight compared with that of an unmodified flask.

TABLE 1

| Days | Weight increase | |
|---|---|---|
| | Example 2 (%) | Comparison (%) |
| 1 | 0.11 | 0.69 |
| 3 | 0.14 | 1.15 |
| 8 | 0.21 | 2.23 |
| 15 | 0.43 | 3.43 |
| 24 | 0.53 | 4.35 |

We claim:

1. A process for preparing a multi-layered moulded article having barrier properties, said moulded article comprising a polyamide and having a duromer layer cured thereon, the process comprising providing a heat-curable reaction resin mixture containing:
   (a) at least one organic polyisocyanate;
   (b) at least one organic compound containing at least 2 epoxide groups,
       components (a) and (b) being contained in a quantity corresponding to an appropriate ratio of isocyanate groups to epoxide groups of from 1.2:1 to 70:1.
   (c) at least one alkylating agent which inhibits the reaction of (a) and (b); and
   (d) from 0.1 to 10%, based on the weight of components (a)+(b)+(c), of at least one heat-activatable catalyst, and applying the heat-curable reaction resin mixture to a moulded polyamide article and thereafter thermally curing the reaction resin mixture to form said duromer layer on the moulded polyamide article.

2. Process according to claim 1, wherein the alkylating agent (c) is selected from an ester of an organic sulphonic acid, methyl iodide or dimethyl sulfate used in quantities of from 0.01 to 1% by weight based on the sum of (a) and (b).

3. Process according to claim 1, wherein in that the polyisocyanate (a) is a polyisocyanate corresponding to the following formula;

$$Q(NCO)_n$$

wherein
n = 2 to 4 and
Q denotes an aliphatic hydrocarbon group containing 2 to 18 carbon atoms, a cycloaliphatic group containing 4 to 19 carbon atoms, an aromatic group containing 6 to 19 carbon atoms or an aliphatic group containing 8 to 13 carbon atoms.

4. Process according to claim 3, wherein in that the polyisocyanate (a) is an isomeric or homologous mixture of polyisocyanates of the diphenylmethane series.

5. Process according to claim 3, wherein in that the polyisocyanate (a) is triisocyanatohexylbiuret.

6. Process according to claim 1, wherein the epoxide component (b) is selected from epoxide compounds having 2-4 epoxide groups and an epoxide equivalent weight of from 90-500.

7. Process according to claim 1 wherein the heat-curable resin mixture is prepared by bringing together components a-c are either simultaneously or successively and either all the components (a)-(c) together or at least components (b)+(c) are subjected to a temperature treatment of up to 150° C for the production of a storable mixture, which storable mixture is then mixed, after cooling, with the heat-activatable catalyst (d) before application to the moulded polyamide article.

8. Process according to claim 1, wherein the heat-curable reaction mixture is applied to the polyamide as a thin layer of form 0.01-14 1 mm, and cured thereon by the action of heat at a temperature of ≧60° C but below the softening temperature of the polyamide.

9. Process according to claim 1, wherein the heat-curable reaction resin mixture is applied to a hot-moulded polyamide article and the heat of the hot-moulded polyamide article is used in the thermal curing of the reaction resin mixture.

10. Process according to claim 9, wherein the moulded polyamide article comprises the reaction product of the anionic polymerization of lactams, and wherein the hot moulded polyamide article is still being heated by the heat of reaction of the lactam polymerisation reaction when the heat-curable reaction resin mixture is applied.

11. A multilayered article with barrier properties prepared by the process of claim 1.

12. The process according to claim 1, wherein the heat-curable reaction mixture additionally contains auxiliary agents or additives.

13. The process according to claim 2, wherein the alkylating agent (c) is used in quantities of from 0.005-0.3% by weight.

14. The process according to claim 10, wherein the heat-curable reaction resin mixture is applied to the hot moulded polyamide article by the rotational process.

15. A multilayered moulded article as claimed in claim 11, having the form of a pipe, tank or sheet.

* * * * *